(12) United States Patent
Kopf

(10) Patent No.: US 12,291,889 B1
(45) Date of Patent: May 6, 2025

(54) SYSTEMS, METHODS, APPARATUSES, AND DEVICES FOR CLEANING AN OPEN BODY

(71) Applicant: Kenneth A. Kopf, Greensboro, NC (US)

(72) Inventor: Kenneth A. Kopf, Greensboro, NC (US)

(*) Notice: Subject to any disclaimer, the term of this patent is extended or adjusted under 35 U.S.C. 154(b) by 0 days.

(21) Appl. No.: 18/900,597

(22) Filed: Sep. 27, 2024

Related U.S. Application Data

(63) Continuation of application No. 29/954,780, filed on Jul. 29, 2024.

(51) Int. Cl.
  *E04H 4/16*   (2006.01)
  *C02F 1/40*   (2023.01)
  *C02F 103/42* (2006.01)

(52) U.S. Cl.
  CPC .............. *E04H 4/1609* (2013.01); *C02F 1/40* (2013.01); *C02F 2103/42* (2013.01)

(58) Field of Classification Search
  CPC ....... E04H 4/1609; C02F 1/40; C02F 2103/42
  USPC ........... 210/232, 238, 167.19, 167.2, 170.01, 210/170.02, 170.03, 170.04, 170.05
  See application file for complete search history.

(56) References Cited

U.S. PATENT DOCUMENTS

| | | | | |
|---|---|---|---|---|
| 4,369,109 A * | 1/1983 | Edge | .............. | B01D 29/96 210/462 |
| 4,822,487 A * | 4/1989 | Soich | .............. | E04H 4/1609 210/241 |
| 5,223,135 A * | 6/1993 | MacPhee | .............. | E04H 4/16 405/63 |
| 5,705,058 A * | 1/1998 | Fischer | .............. | E04H 4/1263 210/242.1 |
| 5,935,450 A * | 8/1999 | Benedict | .............. | E04H 4/1272 210/776 |
| 6,214,217 B1 * | 4/2001 | Sliger, Jr. | .............. | B01D 29/01 210/232 |
| 6,270,683 B1 * | 8/2001 | Turner | .............. | E04H 4/1254 210/167.2 |
| 6,306,295 B1 * | 10/2001 | Giacalone | .............. | E04H 4/14 210/167.2 |
| 6,962,257 B2 * | 11/2005 | Upchurch | .............. | B01D 29/94 210/473 |
| 6,989,093 B1 * | 1/2006 | Greathead | .............. | E04H 4/1254 210/232 |
| 7,171,475 B2 * | 1/2007 | Weisman | .............. | H04L 67/565 709/227 |
| 7,594,997 B1 * | 9/2009 | Kazarian | .............. | E04H 4/1254 210/232 |

(Continued)

*Primary Examiner* — Fred Prince

(74) *Attorney, Agent, or Firm* — Morgan, Lewis & Bockius LLP

(57) ABSTRACT

A device includes a left stand, a right stand, a first net and a second net. Each of the left and right stands includes a longitudinal pole and a lateral pole, with a lower end of the longitudinal pole connected to the lateral pole. The first net is connected to lower portions of the longitudinal poles of the left and right stands, and the second net is connected to the lateral poles of the left and right stands. When the device is in use, the first net has a lower section submerged in a body of water and an upper section above a surface of the body of water for sweeping debris in the body of water, while the second net is below the first net and has a front section before the first net for preventing debris from falling and allowing removal of debris from the body of water.

20 Claims, 13 Drawing Sheets

(56) References Cited

U.S. PATENT DOCUMENTS

| | | | |
|---|---|---|---|
| D619,773 S * | 7/2010 | Diermayer | D32/35 |
| 2002/0027097 A1* | 3/2002 | Baer | E04H 4/1254 |
| | | | 210/167.19 |
| 2004/0094487 A1* | 5/2004 | Upchurch | B01D 29/96 |
| | | | 210/473 |
| 2005/0011819 A1* | 1/2005 | Gillen | E04H 4/1254 |
| | | | 210/167.2 |
| 2009/0188851 A1* | 7/2009 | DePinto | E04H 4/1254 |
| | | | 210/167.2 |
| 2010/0089842 A1* | 4/2010 | Hernandez | E04H 4/1254 |
| | | | 210/776 |
| 2016/0024810 A1* | 1/2016 | Bair | E04H 4/1609 |
| | | | 210/242.1 |
| 2016/0251866 A1* | 9/2016 | Greenwald | E04H 4/1272 |
| | | | 210/167.19 |
| 2018/0030748 A1* | 2/2018 | Arrigo | E04H 4/1609 |

* cited by examiner

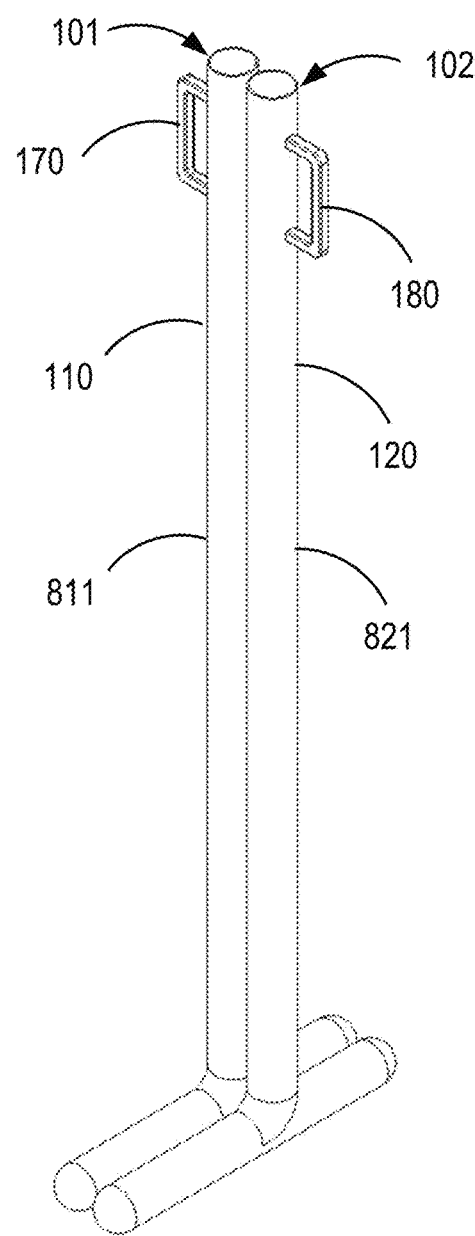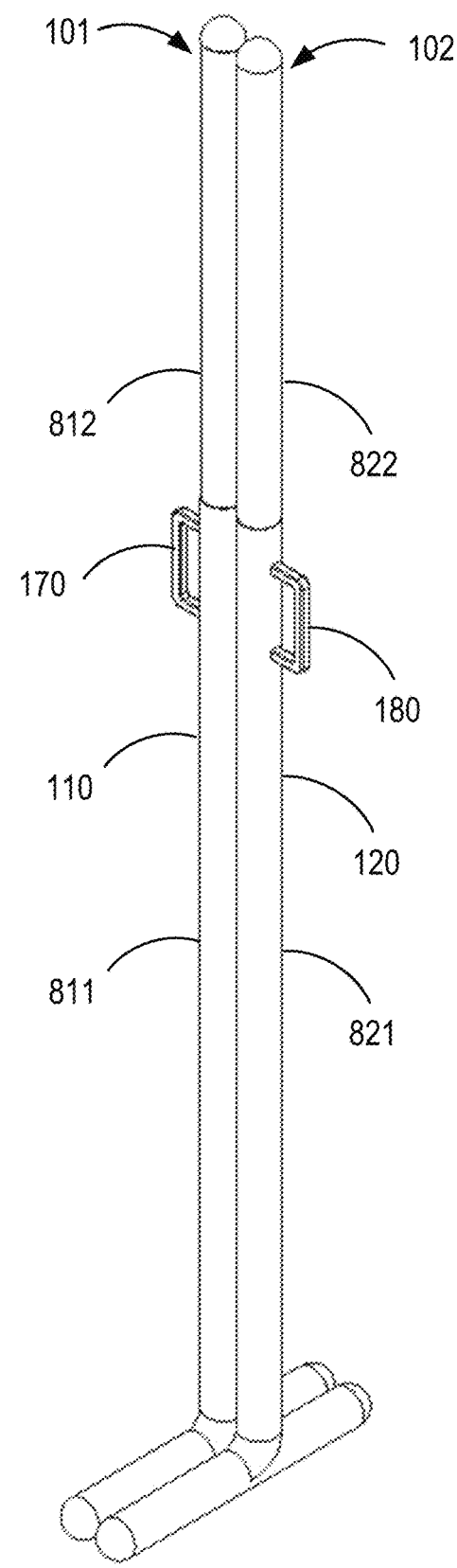
FIG. 8
FIG. 9

SYSTEMS, METHODS, APPARATUSES, AND DEVICES FOR CLEANING AN OPEN BODY

CROSS-REFERENCE TO RELATED APPLICATIONS

The present Application is a continuation of U.S. Design Pat. application No. 29/954,780, entitled "Surface Cleaning Device," filed Jul. 29, 2024, which is hereby incorporated by reference in its entirety for all purposes.

FIELD OF THE INVENTION

The present invention generally relates to systems, methods, apparatuses, and devices for cleaning an open body of liquid, such as for removing debris from a swimming pool.

BACKGROUND

Most swimming pools are not structured to adequately collect and remove larger debris, such as leaves, sticks, grass clippings, and other bits of paper, trash, or other organic material, that are generally less dense than water and typically float on top of or near the upper surface of the pool water. To have a safe, enjoyable, and hygienic swimming experience, owners of swimming pools are often required to periodically skim floating debris from the surface of their pool.

However, existing devices for skimming floating debris are usually configured with a single net to be partially submerged in water to sweep the debris into one spot where the net with the debris may be lifted and removed from the pool. For instance, U.S. Pat. No. 7,909,991 B2 discloses a skimming device that is fixed on the edge of a pool and includes a vertical net partially submerged in the pool water and extendable as the user moves around the perimeter of the pool. Similarly, U.S. Pat. No. 9,523,210 B2 discloses a skimming device that is removably connected to the edge of the pool and includes a vertical net partially submerged in the pool water and extendable as the user moves around the perimeter of the pool. While it may sweep some debris, a partially submerged vertical net is unlikely to prevent some other debris from falling, in particular when the swept debris accumulates and exceeds a certain amount. Moreover, a vertical net is not fitted for removing the debris from the pool. Additional tools and/or actions are required to remove the debris from the pool after the debris is swept to one spot.

Given the current state of the art, there remains a need for surface cleaning devices that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure addresses the abovementioned and/or other issues by providing systems, methods, apparatuses, and devices, such as surface cleaning devices, that can efficiently collect and remove debris from a body of water, such as floating debris from swimming pools.

In various exemplary embodiments, the present disclosure provides a device for removing debris from a body of water. The device includes a left stand, a right stand, a first net and a second net. Each respective stand in the left and right stands includes a corresponding longitudinal pole and a corresponding lateral pole, with a lower end of the corresponding longitudinal pole connected to the corresponding lateral pole. The first net is connected to a lower portion of the corresponding longitudinal pole of each respective stand in the left and right stands such that when the device is in use, the first net has a lower section submerged in the body of water and an upper section above a surface of the body of water, thereby allowing the first net to sweep debris in the body of water. The second net is connected to the corresponding lateral pole of each respective stand in the left and right stands such that the second net is disposed below the first net, and has a front section before the first net, thereby preventing debris from falling and allowing removal of debris from the body of water.

In some embodiments, the left and right stands are substantially symmetric with respect to each other.

In some embodiments, the corresponding longitudinal pole of each respective stand in the left and right stands is substantially perpendicular to the corresponding lateral pole.

In some embodiments, the corresponding longitudinal pole of each respective stand in the left and right stands includes a corresponding first pole segment and a corresponding second pole segment telescopically connected to each other and selectively lockable relative to each other at one or more positions, thereby allowing the longitudinal pole to selectively adjust a length.

In some embodiments, each respective stand in the left and right stands further includes a corresponding longitudinal slot, a corresponding longitudinal spool, a corresponding lateral slot, and a corresponding lateral spool. The corresponding longitudinal slot is formed at a side wall of the lower portion of the corresponding longitudinal pole to accommodate a left or right section of the first net. The corresponding longitudinal spool is disposed in an interior space of the lower portion of the corresponding longitudinal pole to roll and unroll the left or right section of the first net. The corresponding lateral slot is formed at a side wall of the corresponding lateral pole to accommodate a left or right section of the second net. The corresponding lateral spool is disposed in an interior space of the corresponding lateral pole to roll and unroll the left or right section of the second net. As such, the first and second nets are allowed to retract and extend.

In some such embodiments, the corresponding longitudinal or lateral spool includes a spring biased roller to retract the first or second net.

In some embodiments, each of the left and right sections of the first net is substantially one half of the first net, and each of the left and right sections of the second net is substantially one half of the second net.

In some embodiments, each of the first and second nets is able to extend to more than 20 feet wide, more than 25 feet wide, or more than 30 feet wide.

In some embodiments, the first and second nets are made of a same material.

In some embodiments, the lower end of the corresponding longitudinal pole of each respective stand in the left and right stands is connected to the corresponding lateral pole at a location between a front end and a rear end of the corresponding lateral pole, and the second net has a rear section behind the first net.

In some such embodiments, the front section of the second net is larger than the rear section of the second net.

In some embodiments, each respective stand in the left and right stands further includes one or more corresponding handles protruded from a side wall of the corresponding longitudinal pole to facilitate gripping of the respective stand by a user.

In some embodiments, each respective stand in the left and right stands further includes one or more corresponding first cushioning members disposed at the corresponding longitudinal pole to facilitate gripping of the respective stand by a user.

In some such embodiments, each of the one or more corresponding first cushioning members is made of rubber and sleeved on the corresponding longitudinal pole.

In some embodiments, each respective stand in the left and right stands further includes one or more corresponding second cushioning members disposed at the lower portion of the corresponding longitudinal pole and/or the corresponding lateral pole to prevent damage to a pool that holds the body of water.

In some embodiments, the corresponding longitudinal pole of each respective stand in the left and right stands has a dimension of about 75 inches in a longitudinal direction.

In some embodiments, the corresponding lateral pole of each respective stand in the left and right stands has a dimension of at least 10 inches in a lateral direction.

In some embodiments, the first net has a dimension of about 22 inches in a longitudinal direction.

In some such embodiments, when the device is in use, about 12 inches of the first net is submerged in the body of water.

In some embodiments, the second net has a dimension of about 10 inches in a lateral direction.

In some embodiments, a gap is formed between the first net and the second net disposed below the first net, and wherein a width of the gap is less than or equal to a dimension of the debris.

In some embodiments, a dihedral angle associated with the first net and the second net is greater than or equal to 90 degrees.

The devices of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

FIG. 8 is a perspective view illustrating the exemplary device of FIG. 1 in a first retracted state in accordance with some exemplary embodiments of the present disclosure.

FIG. 9 is a perspective view illustrating the exemplary device of FIG. 1 in a second retracted state in accordance with some exemplary embodiments of the present disclosure.

Figure 1:
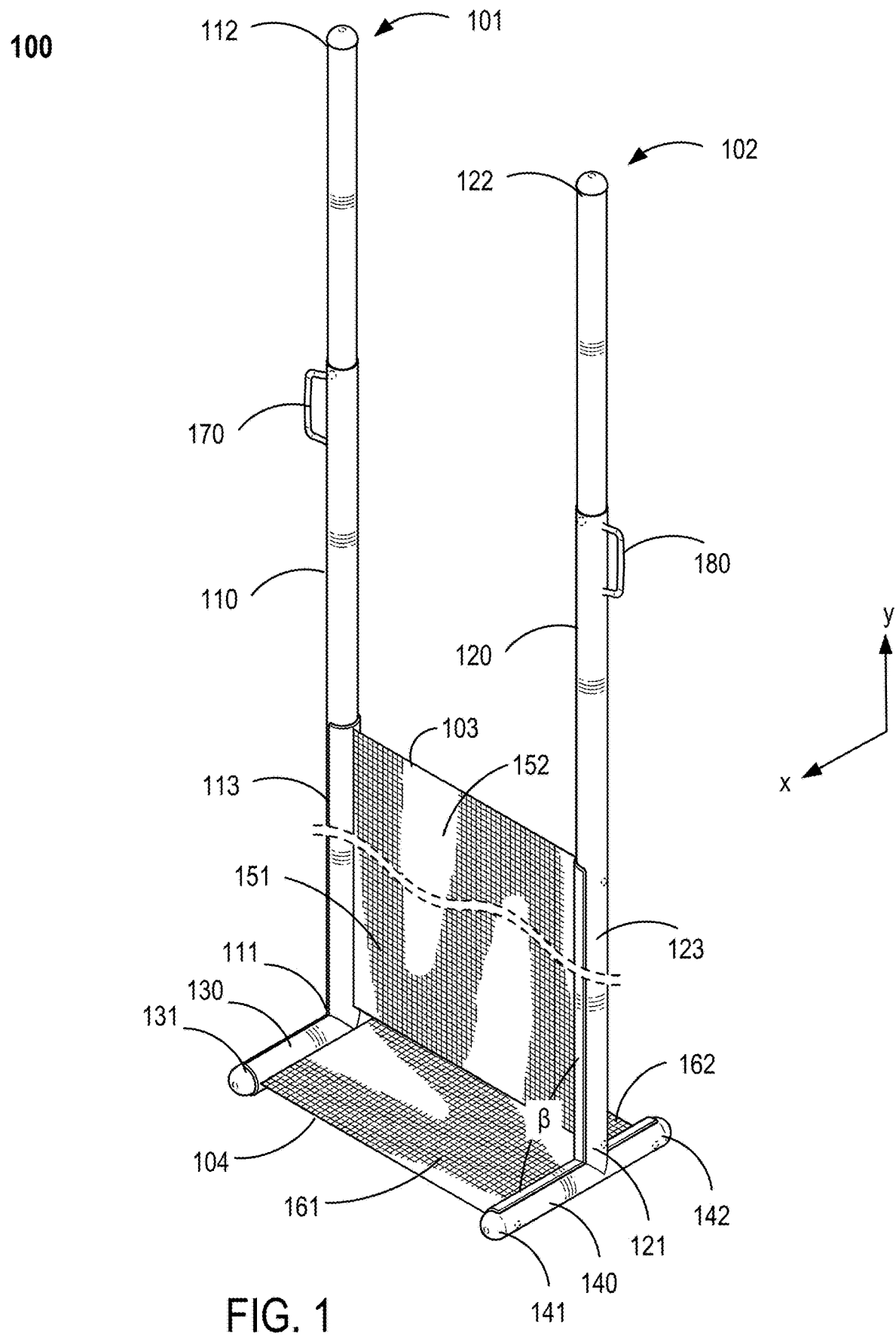
FIG. 1 is a perspective view illustrating an exemplary device in accordance with some exemplary embodiments of the present disclosure.

As will be apparent to those of skill in the art, the components illustrated in the figures described above are combinable in any useful number and combination. The figures are intended to be illustrative in nature and are not limiting.

DETAILED DESCRIPTION

The present disclosure provides surface cleaning devices that efficiently collect and remove debris from a body of water, such as floating debris from a swimming pool. A surface cleaning device of the present disclosure generally includes a left stand, a right stand, a first net and a second net. Each of the left and right stands includes a longitudinal pole and a lateral pole, with a lower end of the longitudinal pole connected to the lateral pole. The first net is connected to lower portions of the longitudinal poles of the left and right stands, and the second net is connected to the lateral poles of the left and right stands. When the device is in use, the first net has a lower section submerged in a body of water and an upper section above a surface of the body of water for sweeping debris in the body of water, while the second net is below the first net and has a front section before the first net for preventing debris from falling and allowing removal of debris from the body of water. In some embodiments, the first and second nets are extendable and retractable, thereby allowing the device to be adjusted for use in a variety of different pools. In some embodiments, longitudinal poles of the left and right stands are extendable and retractable to meet different needs or preferences of different users.

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Referring now to FIGS. 1-5, there is depicted an exemplary device, generally designated as device 100, in accordance with some exemplary embodiments of the present disclosure. Device 100 includes a left stand, such as left stand 101, and a right stand, such as right stand 102. The left and right stands are configured for user(s) to operate the device (e.g., moving the device as desired) and to hold or support other components of the device. The left and right stands may be made of a light weight material, such as aluminum or plastics, which allows for the device to submerge within a body of water and still be liftable by the user(s). In some embodiments, the left and right stands, or at least a portion of the left or right stand, are hollow to reduce the weight of the device and/or to accommodate other components of the device.

In some embodiments, the left and right stands are configured the same as each other or differently from each other. In some embodiments, the left and right stands are configured such that they are substantially symmetrical or mirrored with respect to each other. In some embodiments, each respective stand in the left and right stands includes a corresponding longitudinal pole and a corresponding lateral pole, with a lower end of the corresponding longitudinal pole connected to (e.g., fastened to or formed with) the corresponding lateral pole.

For instance, in some embodiments, left stand 101 includes longitudinal pole 110 and lateral pole 130. In some embodiments, longitudinal pole 110 has lower end 111 and upper end 112, and lateral pole 130 has front end 131 and rear end 132, in which lower end 111 of longitudinal pole 110 is connected to lateral pole 130. Similarly, in some embodiments, right stand 102 includes longitudinal pole 120 and lateral pole 140. In some embodiments, longitudinal pole 120 has lower end 121 and upper end 122, and lateral pole 140 has front end 141 and rear end 142, in which lower end 121 of longitudinal pole 120 is connected to lateral pole 140. However, the present disclosure is not limited thereto.

Figure 11:
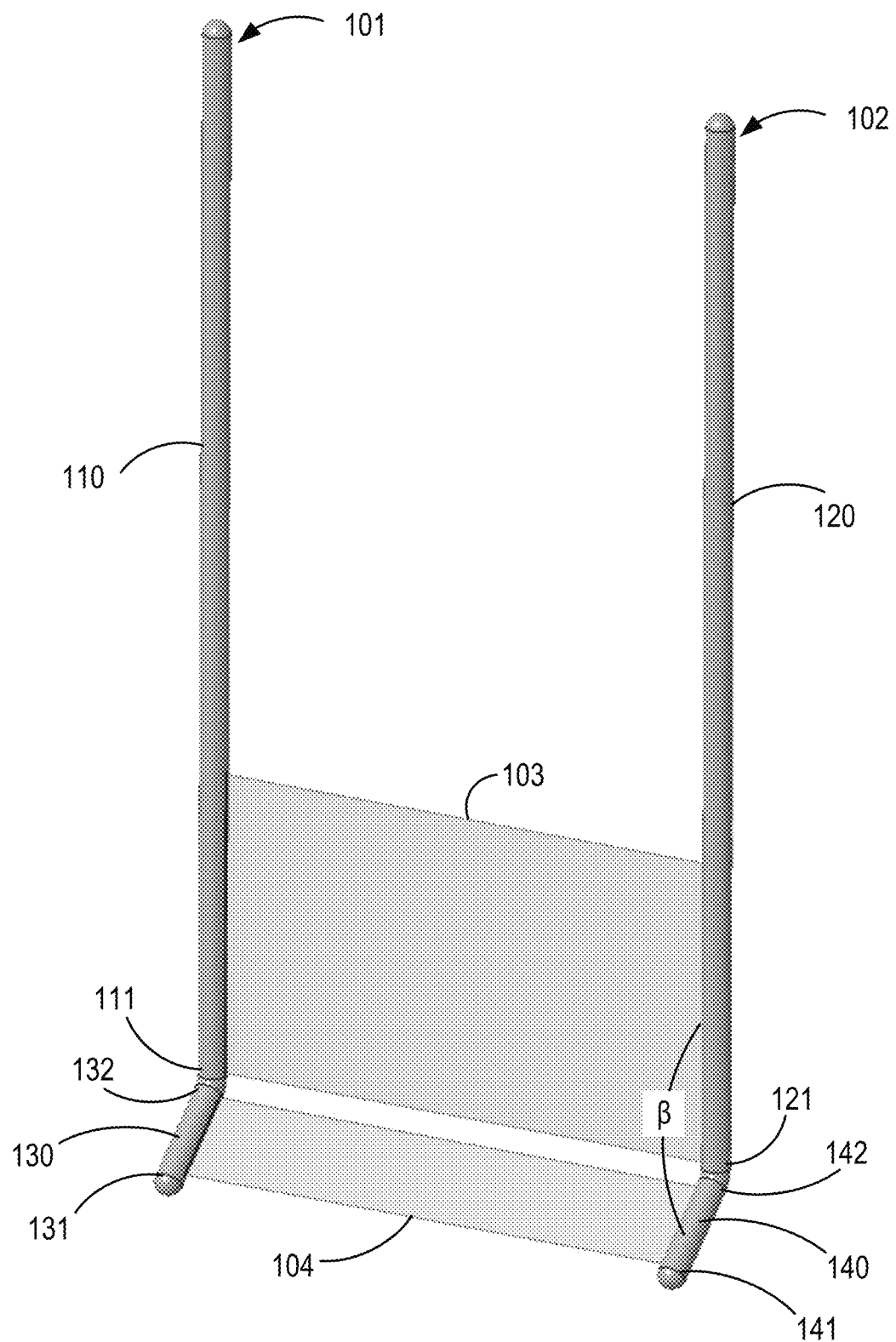
FIG. 11 is a perspective view illustrating an alternative device in accordance with some exemplary embodiments of the present disclosure.
Figure 12:
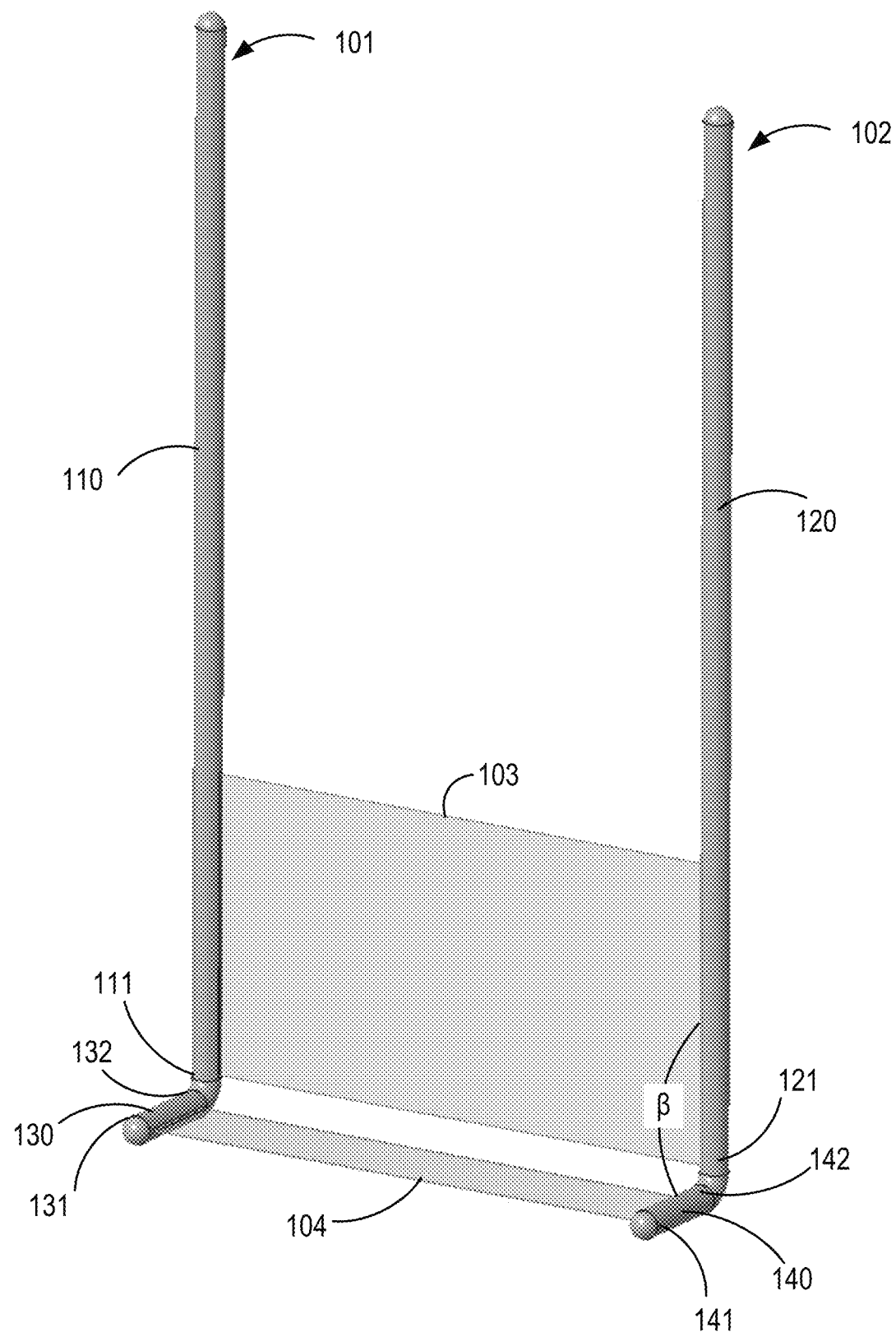
FIG. 12 is a perspective view illustrating another alternative device in accordance with some exemplary embodiments of the present disclosure.

In some embodiments, the lower end of the corresponding longitudinal pole of each respective stand in the left and right stands is connected to the corresponding lateral pole at any suitable location on the corresponding longitudinal pole and/or the corresponding lateral pole. For instance, as a non-limiting example, FIGS. 1-5 illustrate that lower end 111 of longitudinal pole 110 is connected to lateral pole 130 at a location between front end 131 and rear end 132 of lateral pole 130 and that lower end 121 of longitudinal pole 120 is connected to lateral pole 140 at a location between front end 141 and rear end 142 of lateral pole 140. As another non-limiting example, FIGS. 11 and 12 illustrate that lower end 111 of longitudinal pole 110 is connected to rear end 132 of lateral pole 130 and that lower end 121 of longitudinal pole 120 is connected to rear end 142 of lateral pole 140.

The corresponding longitudinal pole of each respective stand in the left and right stands is connected to the corresponding lateral pole at an angle β. In some embodiments, the corresponding longitudinal pole is perpendicular or substantially perpendicular to the corresponding lateral pole, e.g., the angle β is 90 degrees or about 90 degrees, as illustrated in FIGS. 1 and 12. Alternatively, in some embodiments, the corresponding longitudinal pole is oblique to the corresponding lateral pole, e.g., the angle β is less than or greater than 90 degrees. As a non-limiting example, FIG. 11 illustrates an embodiment where the angle β is greater than 90 degrees. In some embodiments, the angle β is within a range of from about 60 degrees to about 120 degrees.

Figure 13:
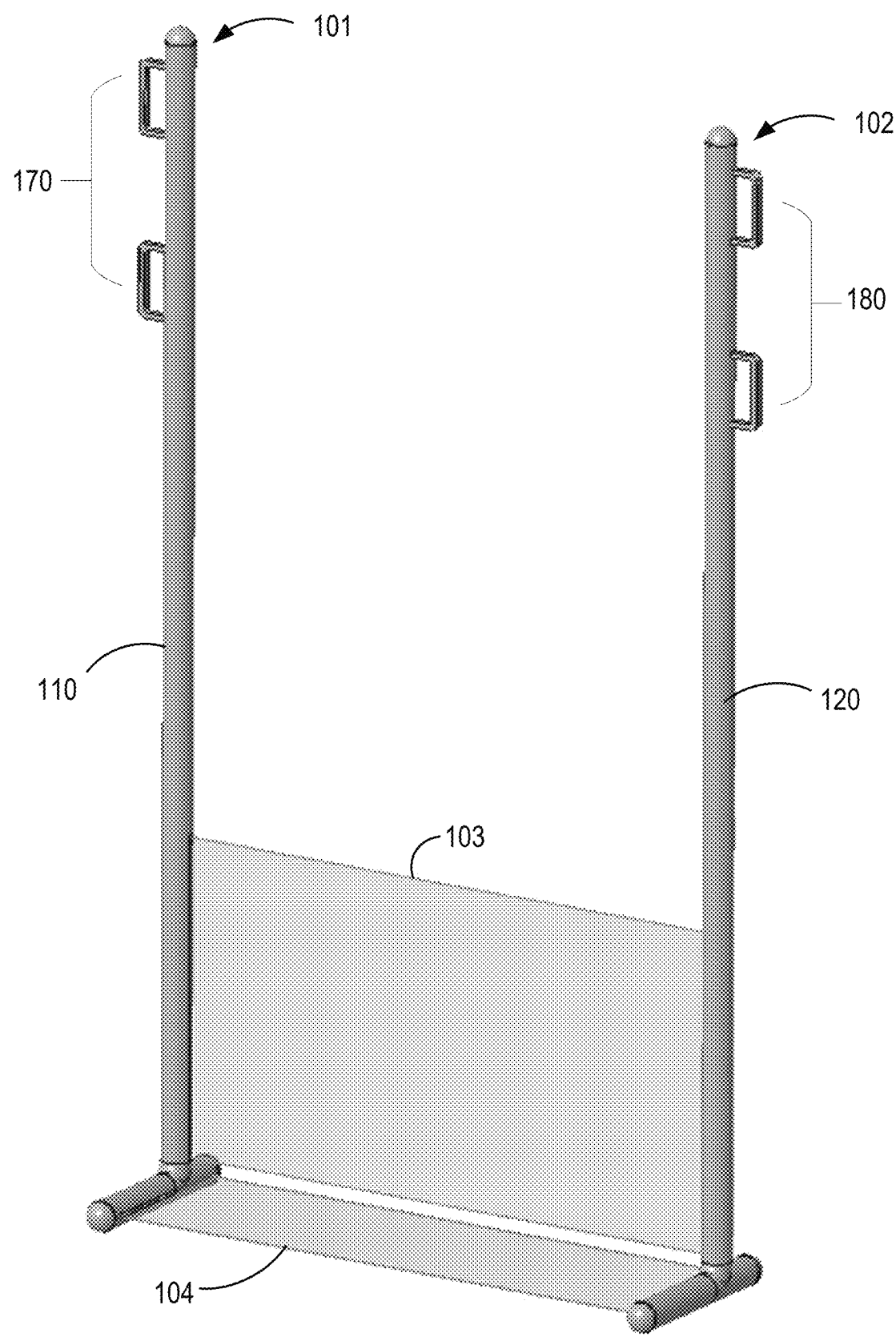
FIG. 13 is a perspective view illustrating still another alternative device in accordance with some exemplary embodiments of the present disclosure.
Figure 14:
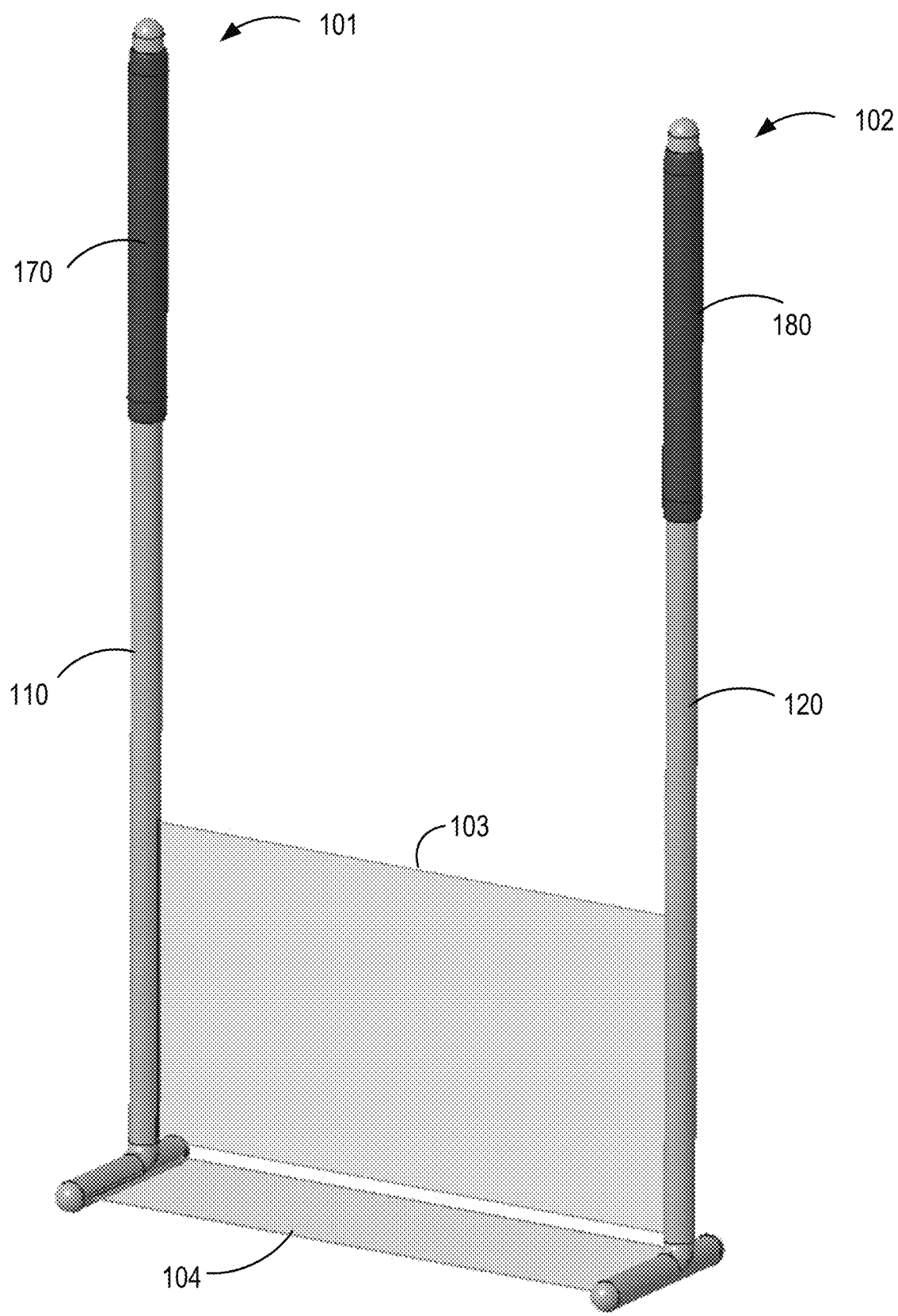
FIG. 14 is a perspective view illustrating yet another alternative device in accordance with some exemplary embodiments of the present disclosure.

In some embodiments, each respective stand in the left and right stands includes a grip for a user to grasp the respective stand and operate the device (e.g., moving the respective stand as desired). The grip is generally disposed at the corresponding longitudinal pole of each respective stand. In some embodiments, the grip is configured in various types and forms. For instance, a grip of each respective stand can include one or more corresponding handles, one or more cushioning members, a combination of handle(s) and cushioning member(s), or the like. As a non-limiting example, FIG. 1 illustrates that left stand 101 includes grip 170 and right stand 102 includes grip 180, wherein each of grip 170 and grip 180 is a handle. As another non-limiting example, FIG. 13 illustrates that left stand 101 includes grip 170 and right stand 102 includes grip 180, wherein each of grip 170 and grip 180 is composed of two handles, which allows for the user to operate the left stand 101 or the right stand 102 with both arms. As still another non-limiting example, FIG. 14 illustrates that left stand 101 includes grip 170 and right stand 102 includes grip 180, wherein each of grip 170 and grip 180 is a cushioning member. In some embodiments, the cushioning member is made of rubber and sleeved on the corresponding longitudinal pole.

Each respective stand in the left and right stands can include additional, optional or alternative components. For instance, in some embodiments, each respective stand in the left and right stands includes one or more additional cushioning members disposed at the lower portion of the corresponding longitudinal pole and/or the corresponding lateral pole to prevent damage to a pool that holds the body of water. In some embodiments, at least one of the left and right stands includes one or more spools disclosed herein.

Referring again to FIGS. 1-5, in some embodiments, device 100 also includes a first net, such as first net 103, and a second net, such as second net 104. For instance, in some embodiments, the device 100 includes at least one net, at least two nets, at least three nets, or the like. In some embodiments, the device 100 include at most two nets, at most three nets, or the like. In some embodiments, the device includes between 1 net and 4 nets, between 2 nets and 4 nets, between 2 nets and 3 nets, or between 3 nets and 4 nets. However, the present disclosure is not limited thereto.

The first and second nets are connected to the left and right stands, either directly or indirectly, and configured for removing debris from a body of water, such as debris in a swimming pool or the like. The first and second nets may be made of a material that allows water to pass through but prevents all or certain debris (e.g., leaves, sticks, grass clippings, etc.) from passing through. Examples of such a material include but are not limited to screens, meshes, fabrics, grids, webs, lattices, and/or perforated materials. The first and second nets can be made of the same material or different materials. In some embodiments, a diameter of the first net and/or the second net is less than a diameter associated with the debris. In some embodiments, the first net and/or the second net includes a polygonal mesh, such as a triangle-mesh, a square-mesh, a hexagonal-mesh, or a combination thereof. In some embodiments, the first net and/or the second net includes a number of openings per square inch of the first net and/or the second net (e.g., a mesh size of the first net and/or the second net) of at least 0.1 inches ("), at least 0.15", at least 0.2", at least 0.25", at least 0.3", at least 0.35", at least 0.4", at least 0.45", at least 0.5", at least 0.55", at least 0.6", at least 0.65", at least 0.7", at least 0.75", at least 0.8", at least 0.38", at least 0.9", at least 0.39", at least 1.0", at least 1.05", at least 1.1", at least 1.15", at least 1.2", at least 1.25", at least 1.3", at least 1.35", at least 1.4", at least 1.45", or at least 1.5". In some embodiments, the number of openings per square inch of the first net and/or the second net is at most 0.1", at most 0.15", at most 0.2", at most 0.25", at most 0.3", at most 0.35", at most 0.4", at most 0.45", at most 0.5", at most 0.55", at most 0.6", at most 0.65", at most 0.7", at most 0.75", at most 0.8", at most 0.38", at most 0.9", at most 0.39", at most 1.0", at most 1.05", at most 1.1", at most 1.15", at most 1.2", at most 1.25", at most 1.3", at most 1.35", at most 1.4", at most 1.45", or at most 1.5". In some embodiments, the number of openings per square inch of the first net and/or the second net is from 0.1" to 1.5", from 0.1" to 1", from 0.1" to 0.5", 0.25" to 1.5", from 0.25" to 1", from 0.25" to 0.5", 0.5" to 1.5", from 0.5" to 1", from 0.75" to 1.5", from 0.75" to 1", from 1" to 1.5", or from 1.25" to 1.5". Furthermore, in some embodiments, the first net and/or the second net includes a rigid material, which prevents the first net and/or the second net from flexing or substantially flexing from a drag force caused by resistance of the body of water acting on the first net and/or the second net when the device traverses through some or all of the body of way. However, the present disclosure is not limited thereto.

In some embodiments, the first net is connected to the left and right stands for sweeping debris in a body of water. In some embodiments, the first net is connected to a lower portion (e.g., a portion adjacent to the lower end) of the corresponding longitudinal pole of each respective stand in the left and right stands. As such, in some embodiments, a lower section of the first net is readily submerged in a body of water while an upper section of the first net can be kept above a surface of the body of water. For instance, as a non-limiting example, FIG. 1 illustrates that the left side of first net 103 is connected to lower portion 113 of longitudinal pole 110 of the left stand and the right side of first net 103 is connected to lower portion 123 of longitudinal pole 120 of the right stand. When the device is in use (e.g., placed in a swimming pool and moved along the swimming pool by two individuals positioned on either side of the swimming pool), lower section 151 of the first net would be submerged in the water while upper section 152 of the first net would be above the surface of the body of water. As the device traverses a length of the body of water, the first net will accommodate debris in the water.

In some embodiments, the second net is connected to the left and right stands for preventing debris from falling away from the device and/or allowing removal of debris from the body of water. In some embodiments, the second net is connected to the corresponding lateral pole of each respective stand in the left and right stands such that the second net is disposed below the first net, and has a front section before the first net. For instance, as a non-limiting example, FIG. 1 illustrates that the left side of second net 104 is connected to lateral pole 130 of the left stand and the right side of second net 104 is connected to lateral pole 140 of the right stand. Second net 104 is disposed below first net 103, and has front section 161 disposed before first net 103 (e.g., in the front side of the first net along the x-direction of FIG. 1). In some embodiments, second net 104 has rear section 162 disposed behind first net 103 (e.g., in the back side of the first net along the x-direction of FIG. 1). The front and rear sections can be the same size (e.g., the dimension the x-direction of FIG. 1) as each other or different sizes from each other. Preferably, the front section of the second net is larger than the rear section of the second net. For instance, in some embodiments, the front section of the second net is at least 1.25 times, at least 1.5 times, at least 1.75 times, or at least 2 times of the rear section of the second net. In some embodiments, a first length associated with the front section of the second net is greater than a second length associated with the rear section of the second net. However, the present disclosure is not limited thereto. For instance, as a non-limiting example, FIG. 11 illustrates that the second net does not include a rear section.

Figure 2:
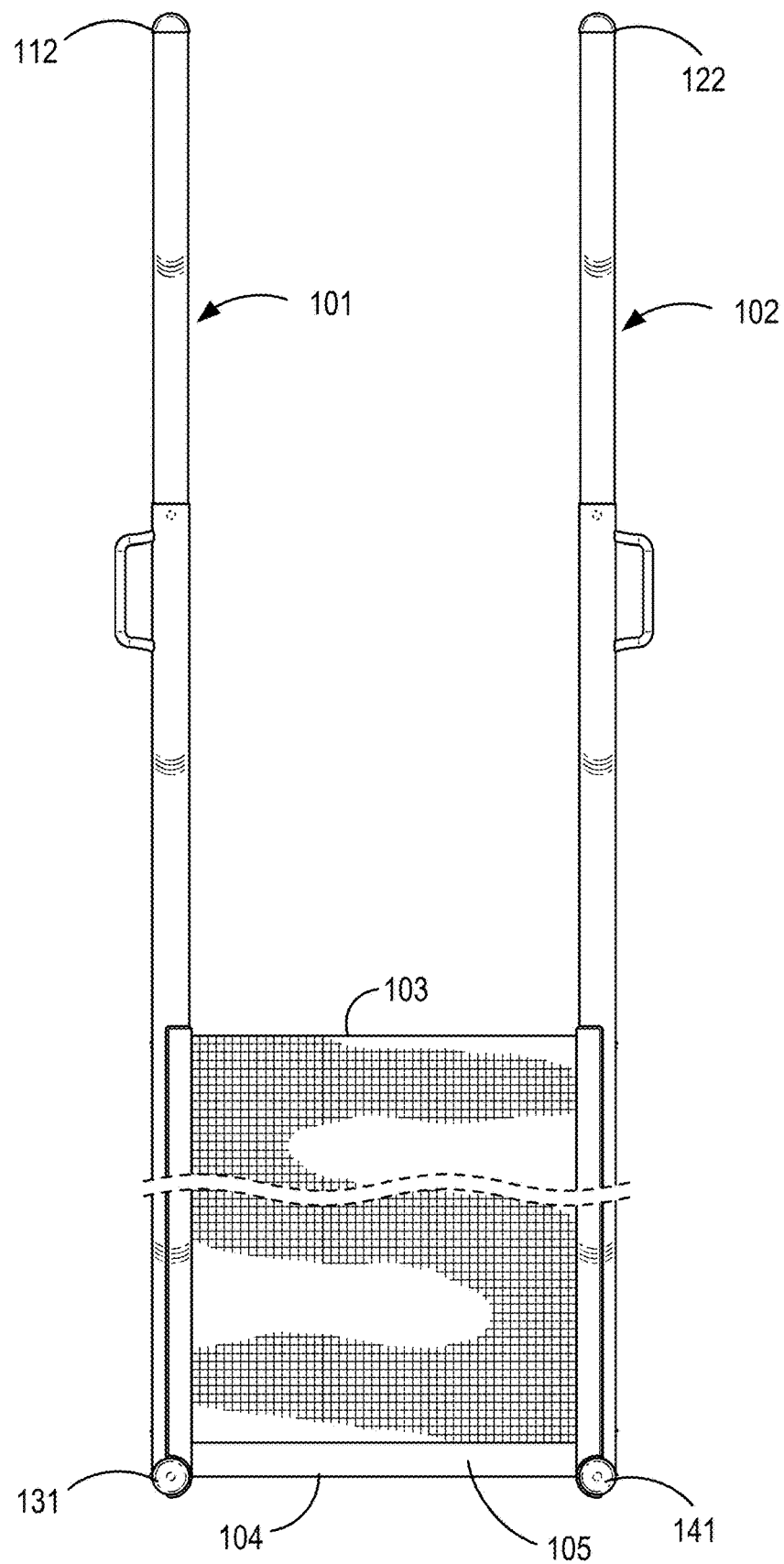
FIG. 2 is a front view of the exemplary device of FIG. 1.

In some embodiments, a gap, such as gap 105 illustrated in FIG. 2, is formed between the first net and the second net. In some such embodiments, the gap is disposed below the first net. The gap has a width (e.g., the vertical dimension in FIG. 2) that is generally less than or equal to a dimension of the debris, such as a length and/or a width of the debris. As such, in some embodiments, the width of the gap prevents debris from falling through the gap between the first and second nets. Moreover, in some embodiments, the gap prevents the first net and the second net from interfacing during operation of the device, such as preventing the first net and the second net from tangling during retraction and/or extension of the first net and second net. However, the present disclosure is not limited thereto. For instance, in some embodiments, there is no gap between the first and second nets, e.g., the second net is connected to or formed with the first net. In an embodiment, the first and second nets collectively form a monolithic net.

In some embodiments, because the first net is connected to the longitudinal poles and the second net is connected to the lateral poles of the left and right stands, a dihedral angle associated with the first net and the second net is generally the same as the angle R between the longitudinal and lateral poles of the left or right stand. In some embodiments, the dihedral angle associated with the first net and the second net is greater than or equal to 90 degrees. In some embodiments, the dihedral angle associated with the first net and the second net is within a range of from about 60 degrees to about 120 degrees.

Figure 6:
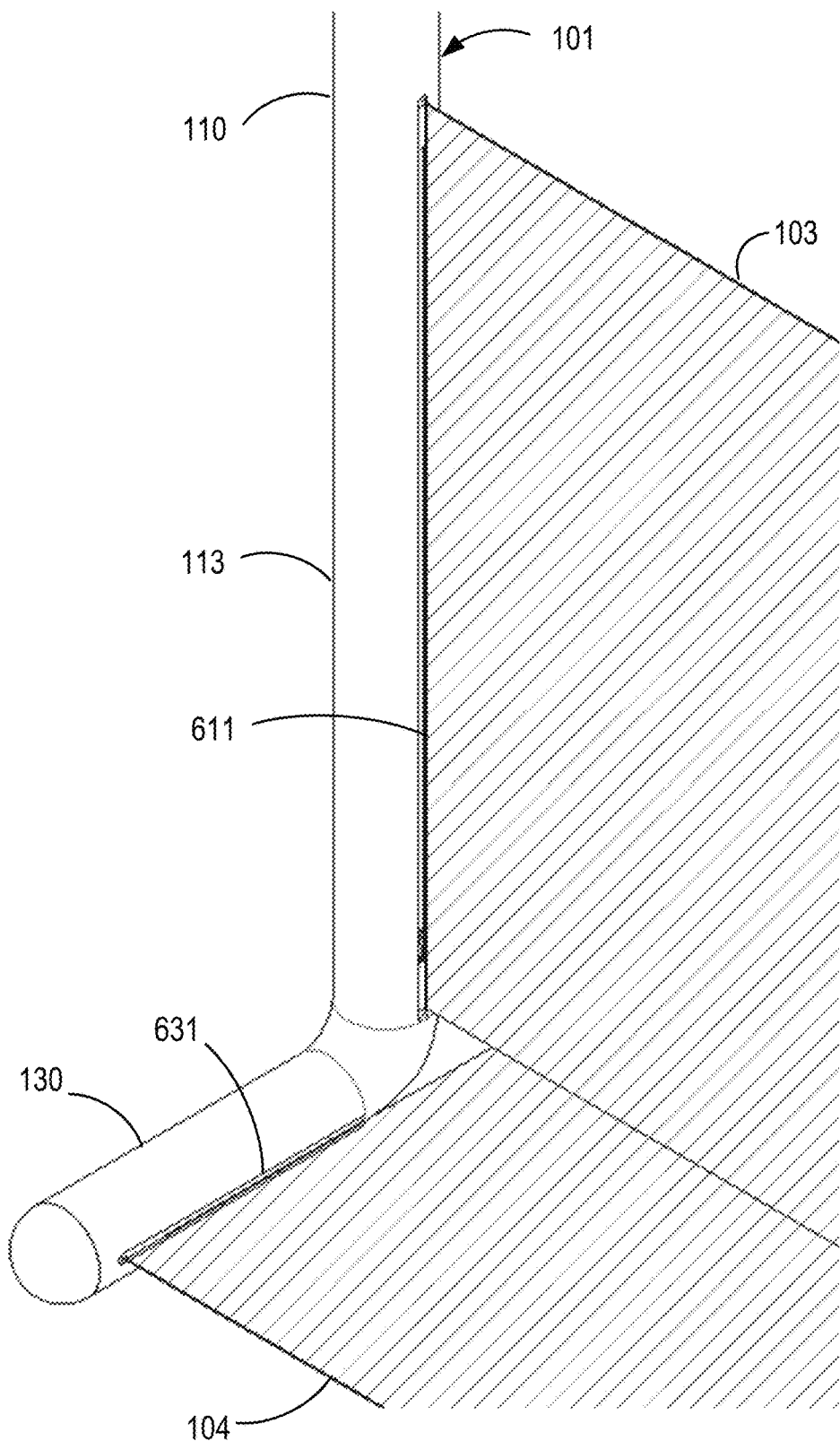
FIG. 6 is a perspective view illustrating a portion of the exemplary device of FIG. 1 in accordance with some exemplary embodiments of the present disclosure.
Figure 7:
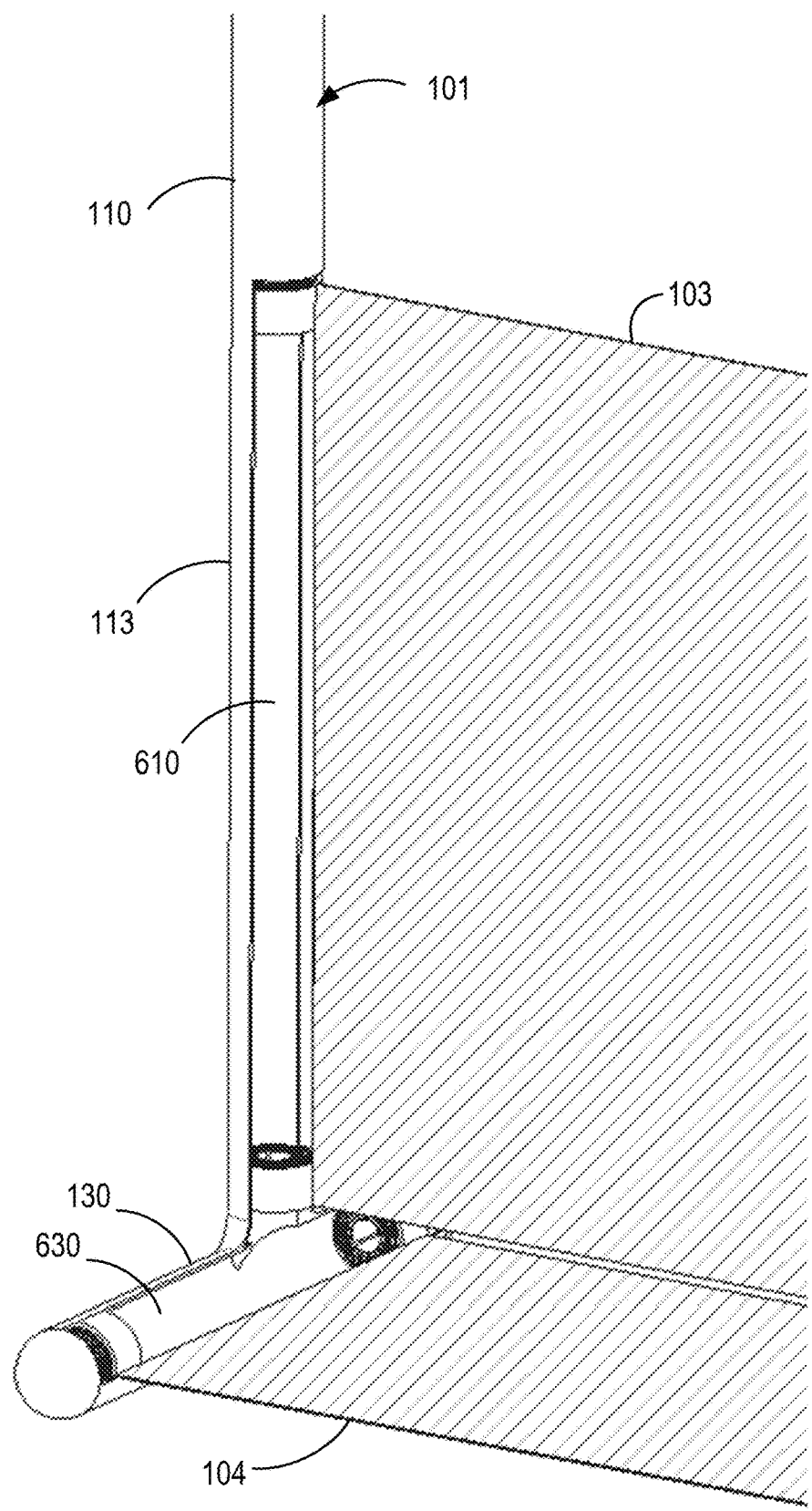
FIG. 7 is a partially cutout view illustrating a portion of the exemplary device of FIG. 1 in accordance with some exemplary embodiments of the present disclosure.

Referring to FIGS. 6 and 7, in some embodiments, the left or right stand includes one or more spools configured to roll and unroll (e.g., wind and unwind) at least a portion of the first and second nets, thereby allowing the first and second nets to retract and extend. In some embodiments, each of the left and right stands includes one or more spools to roll and unroll at least a portion of the first and second nets. For instance, in some embodiments, each spool in the one or more spools is configured to rotate bi-directionally, which allows for rolling (e.g., winding) and unrolling (e.g., unwinding) the first net and/or the second net based on a rotational direction of the spool. In some embodiments, each of the left and right stands includes a longitudinal spool to roll and unroll at least a portion of the first net and a lateral spool to roll and unroll at least a portion of the second net.

A spool may be a spring biased roller, a drug, a reel, and/or the like. For instance, in some embodiments, an edge portion of the first net and/or the second net is coupled to a surface of the spool, in which the first net and/or the second net winds around a body associated with the surface of the spool when retracted and unwinds from the body when extended from the device. However, the present disclosure is not limited thereto. Advantageously, retraction and expansion of the first and section nets allows the device to be adjusted for use in a variety of different pools. Also, when the first and second nets are retracted, the device is compact and portable and requires less storage space. Moreover, in some embodiments, the spool applies a tensile force to the first net and/or the second net, which prevents the first net and/or the second net from flexing or substantially flexing from a drag force caused by resistance of the body of water acting on the first net and/or the second net when the device traverses through some or all of the body of way, further preventing debris from falling through the gap, which may enlarge due to the flexing or substantial flexing of the first net and/or the second net. However, the present disclosure is not limited thereto.

For instance, as a non-limiting example, FIGS. 6 and 7 illustrates that left stand 101 includes a longitudinal spool, such as longitudinal spool 610, disposed in an interior space of lower portion 113 of longitudinal pole 110. A longitudinal slot, such as longitudinal slot 611, is formed at a side wall of lower portion 113 of longitudinal pole 110 to accommodate at least a left section of first net 103, e.g., to allow at least the left section of the first net to pass through. The first net is connected to longitudinal spool 610, which is operable to roll and unroll at least the left section of the first net.

In some embodiments, left stand 101 also includes a lateral spool, such as lateral spool 630, disposed in an interior space of lateral pole 130. A lateral slot, such as lateral slot 631 is formed at a side wall of lateral pole 130 to accommodate at least a left section of second net 104. The second net is connected to lateral spool 630, which is operable to roll and unroll at least the left section of the second net.

In some embodiments, additionally or alternatively, the right stand includes a longitudinal spool and a lateral spool. A longitudinal slot is formed on a side wall of the longitudinal pole of the right stand to accommodate at least a right section of the first net. The longitudinal spool is disposed in an interior space of the longitudinal pole of the right stand to roll and unroll at least the right section of the first net. Similarly, a lateral slot is formed on a side wall of the lateral pole of the right stand to accommodate at least a right section of the section net. The lateral spool is disposed in an interior space of the lateral pole of the right stand to roll and unroll at least a right section of the second net.

In some embodiments, each respective stand in the left and right stands includes a corresponding longitudinal slot formed at a side wall of the lower portion of the corresponding longitudinal pole to accommodate a left or right section of the first net, and a corresponding longitudinal spool disposed in an interior space of the lower portion of the corresponding longitudinal pole to roll and unroll the left or right section of the first net. Each respective stand in the left and right stands also includes a corresponding lateral slot formed at a side wall of the corresponding lateral pole to accommodate a left or right section of the second net, and a corresponding lateral spool disposed in an interior space of the corresponding lateral pole to roll and unroll the left or right section of the second net. In some embodiments, each of the left and right sections of the first net is substantially one half of the first net, and each of the left and right sections of the second net is substantially one half of the second net.

Figure 3:
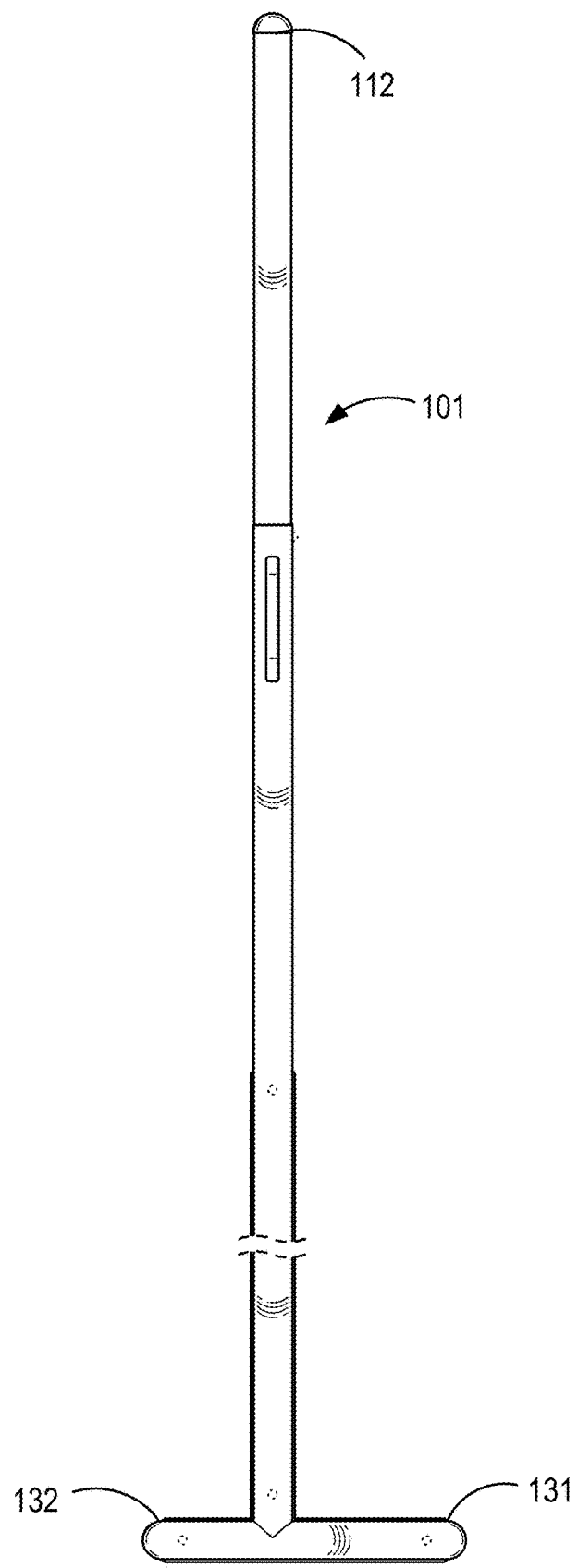
FIG. 3 is a side view of the exemplary device of FIG. 1.
Figure 4:
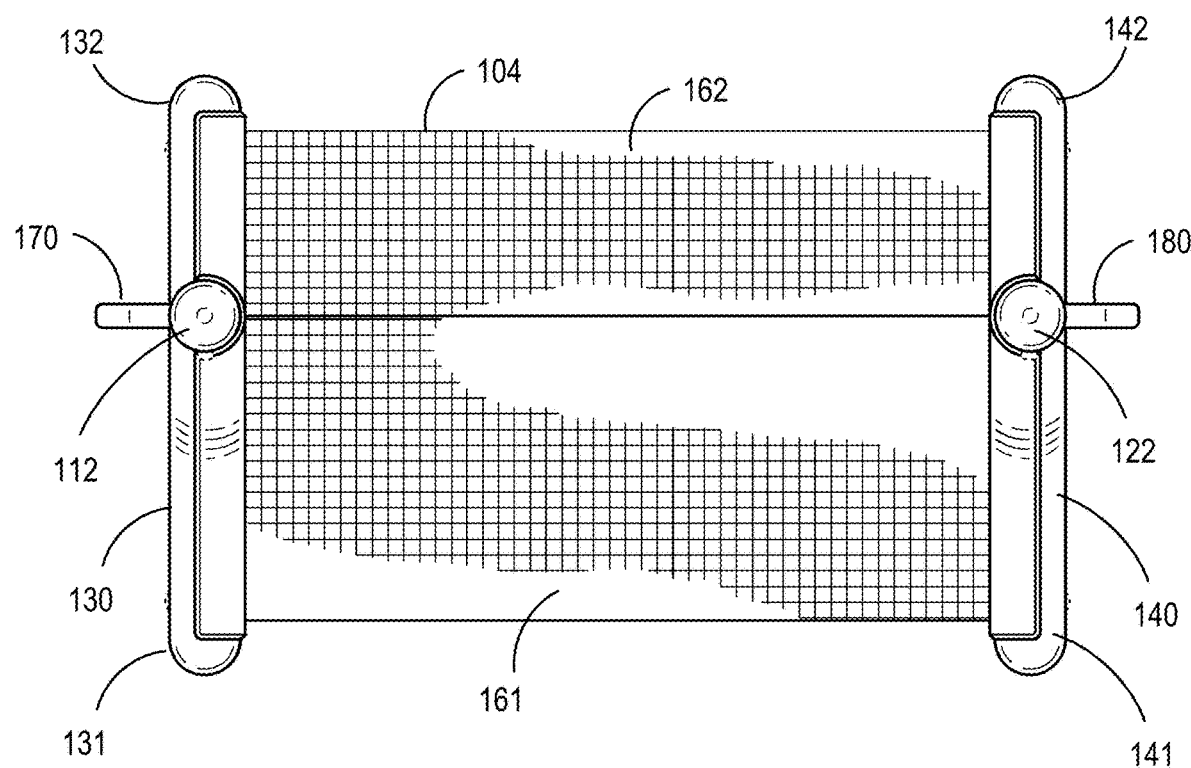
FIG. 4 is a top view of the exemplary device of FIG. 1.
Figure 5:
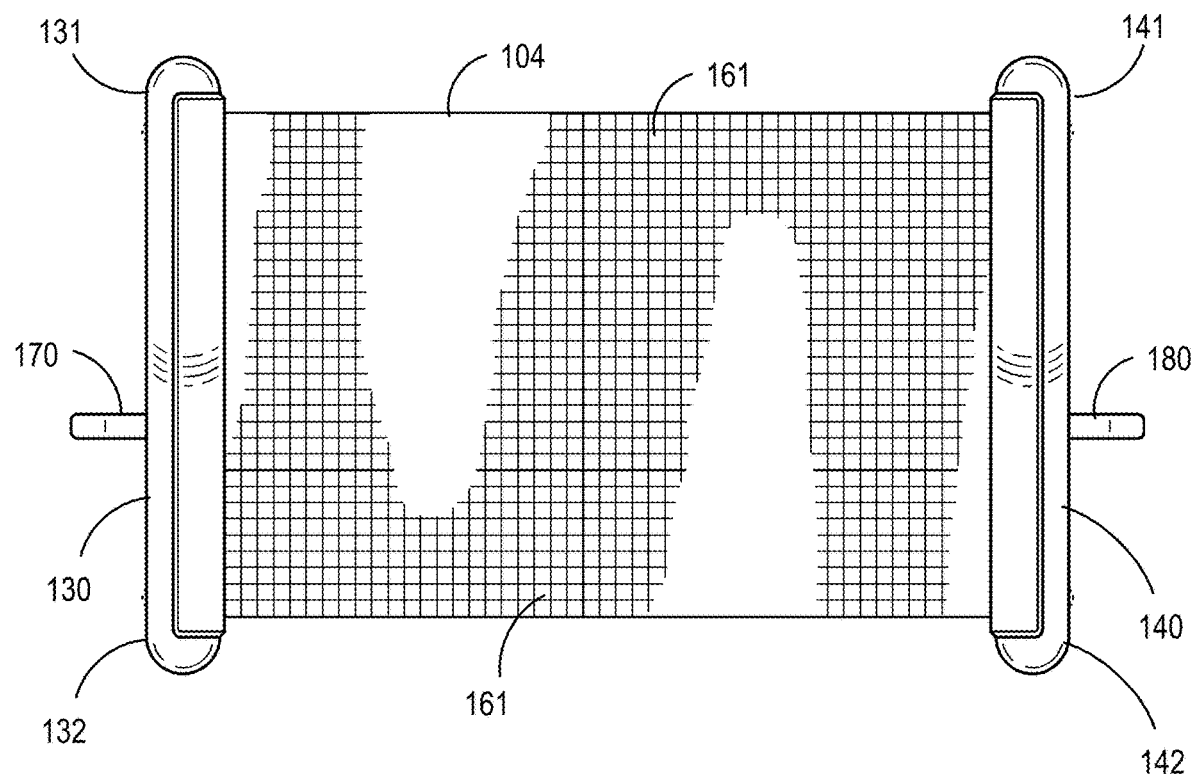
FIG. 5 is a bottom view of the exemplary device of FIG. 1.

Referring briefly to FIGS. 1-3, the device is illustrated with a symbolic break in a length of the device. However, the present disclosure is not limited thereto. In some embodiments, the first or second net is able to extend to more than 5 feet, more than 10 feet wide, more than 15 feet wide, more than 20 feet wide, more than 25 feet, or more than 30 feet. In some embodiments, each of the first and second nets is able to extend to more than 20 feet wide, more than 25 feet wide, or more than 30 feet wide. In some embodiments, each of the first and second net is able to retract substantially completely in the left stand and/or the right stand, thereby allowing the left and right stands to be placed adjacent to each other. As such, when the first and second nets are retracted, the device is compact and portable, and requires less storage space.

Referring to FIGS. 8 and 9, in some embodiments, the corresponding longitudinal pole of each respective stand in the left and right stands includes a corresponding first pole segment and a corresponding second pole segment telescopically connected to each other and selectively lockable relative to each other at one or more positions, thereby allowing the longitudinal pole to selectively adjust a length. For instance, longitudinal pole 110 of left stand 101 includes first pole segment 811 and second pole segment 812 telescopically connected to each other, e.g., second pole segment 812 can be extended and retracted with respect to and first pole segment 811. However, the present disclosure is not limited thereto. For instance, in some embodiments, the corresponding longitudinal pole of each respective stand in the left and right stands can include 3 or more segments telescopically connected to each other. In some embodiments, longitudinal pole 120 of right stand 102 includes first pole segment 821 and second pole segment 822 telescopically connected to each other, e.g., second pole segment 822 can be extended and retracted with respect to and first pole segment 821.

In some embodiments, first pole segment 811 and second pole segment 812 are selectively lockable relative to each other when second pole segment 812 is extended (e.g., as illustrated in FIG. 9). When locked, first pole segment 811 and second pole segment 812 are not allowed to move relative to each other, thereby preventing accidental retraction. When unlocked, first pole segment 811 and second pole segment 812 are allowed to move relative to each other, thereby allowing desired adjustment (e.g., retraction). In some embodiments, first pole segment 811 and second pole segment 812 are selectively lockable relative to each other when second pole segment 812 is retracted (e.g., as illustrated in FIG. 8). In some embodiments, first pole segment 811 and second pole segment 812 are selectively lockable relative to each other at one or more additional positions between the position when second pole segment 812 is retracted as illustrated in FIG. 8 and the position when second pole segment 812 is extended as illustrated in FIG. 9.

Figure 10:
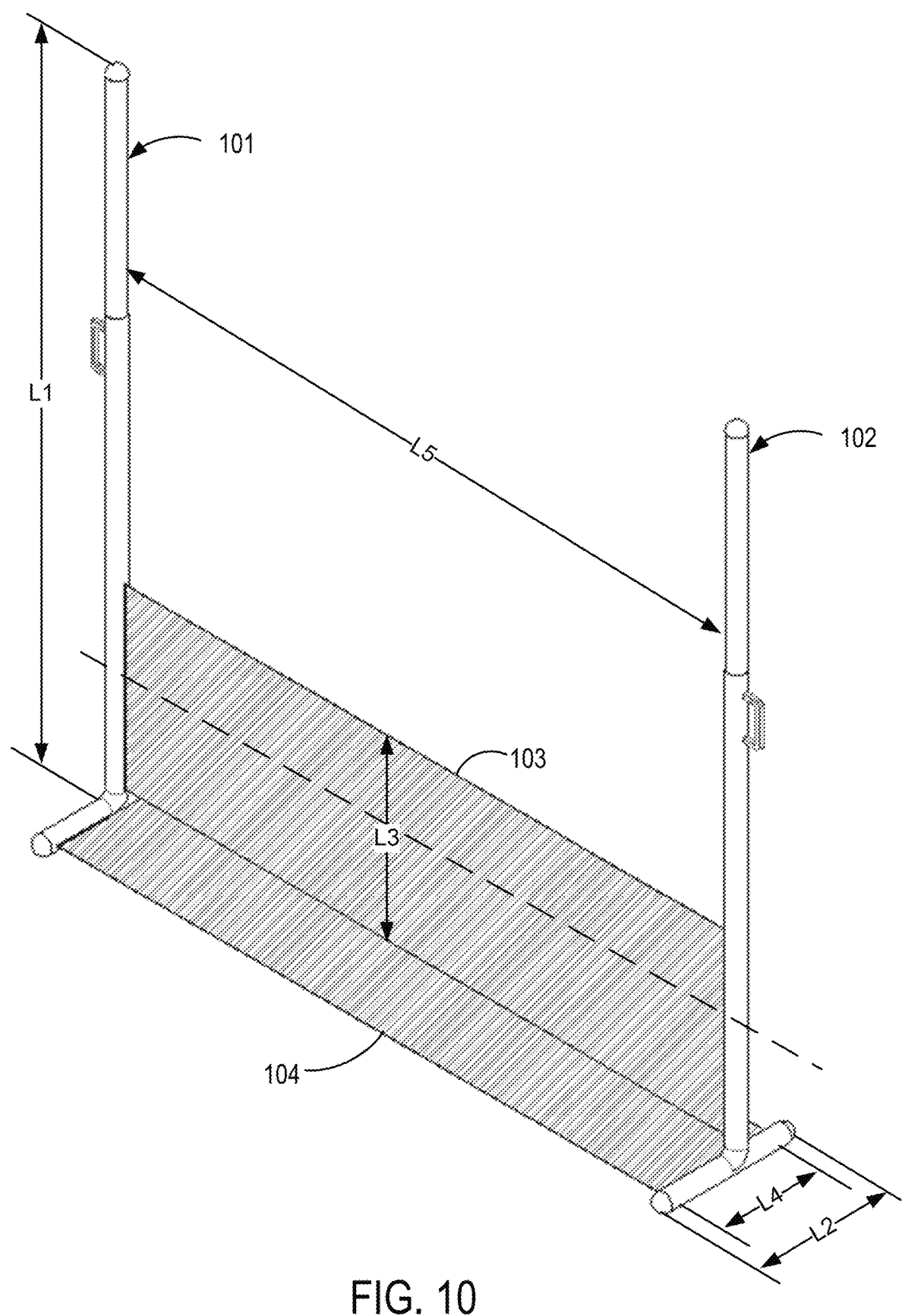
FIG. 10 is a perspective view illustrating the exemplary device of FIG. 1 in an extended state in accordance with some exemplary embodiments of the present disclosure.

Referring to FIG. 10, in some embodiments, the corresponding longitudinal pole of each respective stand in the left and right stands has a dimension L1 in a longitudinal direction, and the corresponding lateral pole of each respective stand in the left and right stands has a dimension L2 in a lateral direction. Also, the first net has a dimension L3 in the longitudinal direction and the second net has a dimension L4 in the lateral direction. In addition, the first and second nets has a width L5, which in some cases can be adjusted (e.g., the first and second nets can be extended and retracted as disclosed herein).

In some embodiments, dimension L1 of the longitudinal pole of the left or right stand is from about 50 inches to about 100 inches. In an embodiment, dimension L1 of the longitudinal pole of the left or right stand is about 70 inches, about 75 inches, or about 80 inches. In some embodiments, dimension L2 of the lateral pole of the first or second stand is at least 8 inches, at least 9 inches, at least 10 inches, at least 11 inches, or at least 12 inches. In some embodiments, dimension L3 of the first net is from about 15 inches to about 35 inches. In an embodiment, dimension L3 of the first net is about 20 inches, about 22 inches, or about 24 inches. When the device is in use, a portion of the first net is submerged in the body of water (e.g., below the water surface indicated by the dash line). In some embodiments, about 12 inches of the first net is submerged in the body of water. In an embodiment, more than 12 inches of the first net is submerged in the body of water. In another embodiment, less than 12 inches of the first net is submerged in the body of water. Dimension L4 of the second net is typically less than or equal to dimension L2 of the lateral pole. In some embodiments, dimension L4 is about 10 inches. In some embodiments, dimension L5 is at least 15 inches, at least inches, at least 25 inches, at least 30 inches, at least 35 inches, or at least 40 inches.

The devices of the present disclosure have several advantages. For instance, with extendable/retractable longitudinal poles, users can adjust the length of the longitudinal poles as illustrated in FIGS. 8 and 9 in accordance with their heights or preferences. With extendable/retractable first and second nets, users can adjust dimension L5 of the first and second nets in accordance with the sizes of their pools. When in a retracted state as illustrated in FIG. 8 or in a retracted state as illustrated in FIG. 9, the device is compact, requiring less storage space and easy to carry around. When extended, the device is easy to use. For instance, the left and right stands can be moved, for instance, by individuals on opposite sides of a swimming pool to clean the swimming pool.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. As used herein, the term "about" is relative to the actual value stated, as will be appreciated by those of skill in the art and allows for approximations, inaccuracies and limits of measurement under the relevant circumstances. In one or more aspects, the terms "about," "substantially," and "approximately" may provide an industry-accepted tolerance for their corresponding terms and/or relativity between items, such as a tolerance of from less than one percent to ten percent of the actual value stated, and other suitable tolerance.

It will be understood that the terms "front" or "rear," "left" or "right," "top" or "bottom," "lower" or "upper," and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first pole could be termed a second pole, and, similarly, a second pole could be termed a first pole, without changing the meaning of the description, so long as all occurrences of the "first pole" are renamed consistently and all occurrences of the "second pole" are renamed consistently.

What is claimed is:

1. A device for removing debris from a body of water, the device comprising:
    a left stand and a right stand, each respective stand in the left and right stands comprising a corresponding longitudinal pole and a corresponding lateral pole, wherein a lower end of the corresponding longitudinal pole is connected to the corresponding lateral pole;
    a first net connected to a lower portion of the corresponding longitudinal pole of each respective stand in the left and right stands;
    a second net connected to the corresponding lateral pole of each respective stand in the left and right stands such that the second net is disposed below the first net, and has a front section before the first net; and
    wherein a respective stand in the left and right stands further comprises:
        a corresponding longitudinal slot formed at a side wall of the lower portion of the corresponding longitudinal pole to accommodate a left or right section of the first net,
        a corresponding longitudinal spool disposed in an interior space of the lower portion of the corresponding longitudinal pole to roll and unroll the left or right section of the first net,
        a corresponding lateral slot formed at a side wall of the corresponding lateral pole to accommodate a left or right section of the second net, and
        a corresponding lateral spool disposed in an interior space of the corresponding lateral pole to roll and unroll the left or right section of the second net.

2. The device of claim 1, wherein the left and right stands are substantially symmetric with respect to each other.

3. The device of claim 1, wherein the corresponding longitudinal pole of each respective stand in the left and right stands is substantially perpendicular to the corresponding lateral pole.

4. The device of claim 1, wherein the corresponding longitudinal pole of each respective stand in the left and right stands comprises a corresponding first pole segment and a corresponding second pole segment telescopically connected to each other and selectively lockable relative to each other at one or more positions, thereby allowing the longitudinal pole to selectively adjust a length.

5. The device of claim 1, wherein the corresponding longitudinal or lateral spool comprises a spring biased roller to retract the first or second net.

6. The device of claim 1, wherein:
    each of the left and right sections of the first net is substantially one half of the first net; and
    each of the left and right sections of the second net is substantially one half of the second net.

7. The device of claim 1, wherein each of the first and second nets is able to extend to more than 20 feet wide, more than 25 feet wide, or more than 30 feet wide.

8. The device of claim 1, wherein:
    the lower end of the corresponding longitudinal pole of each respective stand in the left and right stands is connected to the corresponding lateral pole at a location between a front end and a rear end of the corresponding lateral pole; and
    the second net has a rear section behind the first net.

9. The device of claim 8, wherein the front section of the second net is larger than the rear section of the second net.

10. The device of claim 1, wherein each respective stand in the left and right stands further comprises one or more corresponding handles protruded from a side wall of the corresponding longitudinal pole to facilitate gripping of the respective stand by a user.

11. The device of claim 1, wherein each respective stand in the left and right stands further comprises one or more corresponding first cushioning members disposed at the corresponding longitudinal pole to facilitate gripping of the respective stand by a user.

12. The device of claim 11, wherein each of the one or more corresponding first cushioning members is made of rubber and sleeved on the corresponding longitudinal pole.

13. The device of claim 1, wherein each respective stand in the left and right stands further comprises one or more corresponding second cushioning members disposed at the lower portion of the corresponding longitudinal pole and/or the corresponding lateral pole.

14. The device of claim 1, wherein the corresponding longitudinal pole of each respective stand in the left and right stands has a first dimension of about 75 inches in a longitudinal direction and/or has a second dimension of at least 10 inches in a lateral direction.

15. The device of claim 1, wherein the first net has a first dimension of about 22 inches in a longitudinal direction and/or the second net has a second dimension of about 10 inches in a lateral direction.

16. The device of claim 1, wherein a gap is formed between the first net and the second net disposed below the first net, and wherein a width of the gap is less than or equal to a dimension of the debris.

17. The device of claim 16, wherein the gap extends from a first portion of the corresponding longitudinal pole of the left stand to a second a second portion of the corresponding longitudinal pole of the right stand.

18. The device of claim 1, wherein a dihedral angle associated with the first net and the second net is greater than or equal to 90 degrees.

19. The device of claim 1, wherein the first net and/or the second net comprises a triangle-mesh, a square-mesh, a hexagonal-mesh, or a combination thereof.

20. The device of claim 1, wherein each respective stand in the left and right stands further comprises:

the corresponding longitudinal slot formed at the side wall of the lower portion of the corresponding longitudinal pole to accommodate the left or right section of the first net, the corresponding longitudinal spool disposed in the interior space of the lower portion of the corresponding longitudinal pole to roll and unroll the left or right section of the first net, the corresponding lateral slot formed at the side wall of the corresponding lateral pole to accommodate the left or right section of the second net, and the corresponding lateral spool disposed in an interior space of the corresponding lateral pole to roll and unroll the left or right section of the second net.

* * * * *